United States Patent Office.

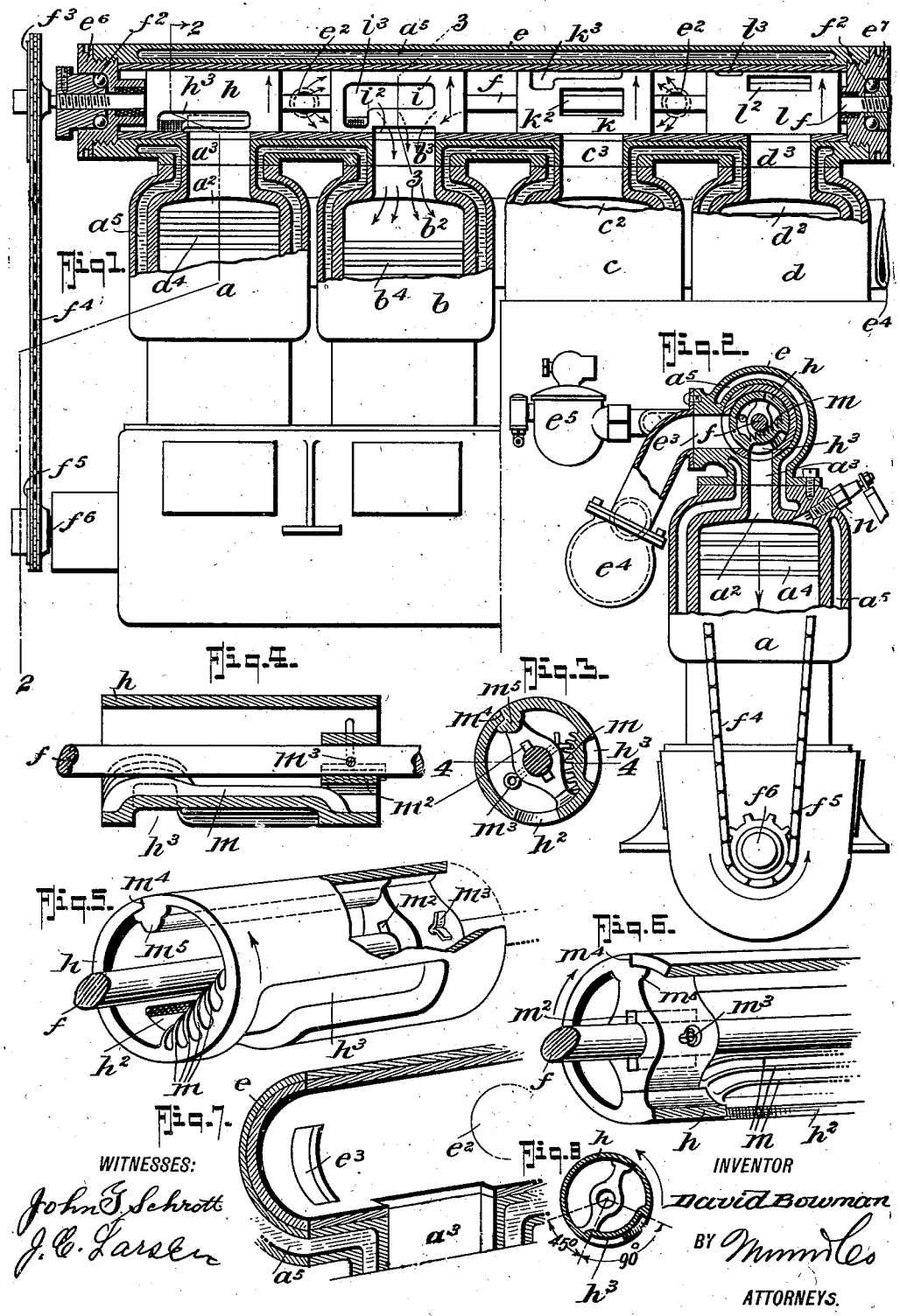

DAVID BOWMAN, OF EDMONTON, ALBERTA, CANADA.

ROTARY VALVE.

1,138,446.  Specification of Letters Patent.  Patented May 4, 1915.

Application filed June 3, 1914. Serial No. 842,666.

*To all whom it may concern:*

Be it known that I, DAVID BOWMAN, a subject of the King of Great Britain, and resident of Edmonton, in the Province of Alberta, Dominion of Canada, have invented certain new and useful Improvements in Rotary Valves, of which the following is a specification.

My invention relates to multi-cylinder engines, particularly to those using gas or oil as fuel, and one of the objects thereof is to provide a rotary valve for each of said cylinders having, each, an inlet port and an exhaust passage.

A further object is to provide such valves which will not be affected by the intense heat of the exhaust gases to injure the efficiency thereof.

A further object is to accomplish this result by reducing the distance of travel of the burnt gases from the combustion chamber to the exhaust manifold to a minimum.

A further object is to provide flanges within said valves whereby relatively great radiating surface results, thus serving to heat the cool mixture from the intake ports previous to the admission thereof to the cylinders for compression and ignition, and also preventing the overheating of the valves and casing thereof.

A further object is to split the valves longitudinally, to permit expansion and contraction thereof without the possibility of the valves sticking in the casing, and to make the joint overlapping to avoid leakage; and a further object is to provide individual valves for the cylinders which are loosely mounted upon a common shaft to permit expansion and contraction, but in such manner as to be immovable either rotarily or longitudinally of said shaft.

My invention is fully set forth in the following specification, of which the accompanying drawings form a part, in which the same reference characters are used to designate the same parts in each of the views, and in which:—

Figure 1 is a fragmentary elevation of a four cylinder, 4 cycle, water-cooled, engine, showing the valve and ports in central, vertical, longitudinal, section; Fig. 2 is a section taken on the line 2—2 of Fig. 1; Fig. 3 a detail section taken on the line 3—3 of Fig. 1; Fig. 4 is a section taken on the line 4—4 of Fig. 3; Fig. 5 is a perspective view of one of the valve sections, partly in section; Fig. 6 is a sectional, perspective, view of said valve section, viewed from the opposite end, and showing the feather and cotter-pin connection thereof with the shaft; Fig. 7 is a sectional, perspective, view of the valve casing, showing exhaust and part of inlet ports; and Fig. 8 is a section of the valve and showing, diagrammatically, the relative positions of the inlet and exhaust ports.

In the drawings forming a part of this application I have shown a multi-cylinder engine having four cylinders $a$, $b$, $c$ and $d$, provided, each, with a combustion chamber $a^2$, $b^2$, $c^2$, and $d^2$, and inlet $a^3$, $b^3$, $c^3$, and $d^3$, respectively, pistons $a^4$ and $b^4$ being shown in corresponding cylinders, and a water-jacket $a^5$ encompasses all of said cylinders as also the valve casing $e$, all these parts being of conventional form.

The valve casing $e$ is provided with a plurality of inlet ports $e^2$, shown in Fig. 1, and an exhaust port $e^3$ for each of the cylinders and all of which lead to the exhaust manifold $e^4$, this being clearly illustrated in Fig. 2, and all of the intake ports are connected with the carbureter $e^5$, and, by reference to Fig. 2, it will be noted that the outlet ports $e^3$ are located very close to the cylinder ports $a^3$, $b^3$, $c^3$ and $d^3$, the first of which is shown in said figure, thus reducing the travel of the burnt gases from the cylinders to the exhaust manifold to a minimum.

Passing centrally and longitudinally through the valve casing $e$ is a shaft $f$ guided by anti-frictional bearings $f^2$ in detachable caps $e^6$ and $e^7$ on the valve casing, a sprocket $f^3$ being mounted on one end of the shaft $f$ and which is in connection, by means of a chain $f^4$, with a sprocket $f^5$ on the crank-shaft $f^6$ of the engine, this being the usual 2 to 1 reduction gearing, but, as will be understood, a train of gears may be substituted for the sprockets and chain.

The shaft $f$ carries the rotary valve consisting of four distinct members, preferably, as clearly shown in Fig. 1, one above each cylinder, and each of said members $h$, $i$, $k$ and $l$, is provided with an inlet port $h^2$, $i^2$, $k^2$ and $l^2$ and exhaust passages $h^3$, $i^3$, $k^3$, and $l^3$, respectively, and said passages are formed in the outer surfaces of said valve members and have no communication with the interior thereof, as clearly shown in Fig. 2, and, as shown in Figs. 1, 4 and 5, the said passages are enlarged at one end thereof, being on a greater arc of a circle at this point than the length of the arc for the greater portion of said passages, whereby communication thereof with the exhaust manifold is continued for a corresponding period at one point of said passages whereas the entire length of said passages is in communication with the combustion chamber of corresponding cylinders.

Each of the valve members is provided, on the interior thereof, in the position of the exhaust passage, with a plurality of interiorly directed flanges which give a corresponding radiating surface and serve to distribute the heat from the burnt gases over the interior of the valve members and, thereby, prevent overheating of the said members and of the valve casing, as well as serving to raise the temperature of the incoming mixture, previous to its admission into the cylinders, said flanges bearing the reference character $m$, and each of said valve members is secured to the shaft $f$ by means of a feather $m^2$ to prevent rotary motion on the shaft, and a cotter-pin $m^3$ to prevent movement longitudinally thereof, said connection being made sufficiently loose to admit of a degree of expansion and contraction of the valve members and of the shaft, and it will also be noted that the valve members are longitudinally split at $m^4$, for the same reason, but the joint at this point is made proof against leakage by an overhanging portion $m^5$ of the valve member and which also serves as a seat for the free portion and upon which it may slide.

By reference to Fig. 1 it will be seen that both the valve member inlets and exhaust passages are made of a length to extend the full width of the cylinder port $a^3$, $b^3$, etc. to permit full and free entry and exhaust of the mixture and of the burnt gases, respectively, and thus insure full efficiency to the engine and it will also be seen, in this figure, that the shaft $f$ projects beyond the casing $e$ in order to connect the same, if desired, with a dynamo, timer, pump, etc., etc.

The valve members are all exactly alike and are thus interchangeable and, as illustrated, are set for firing in 1, 2, 3, 4, order, this setting being accomplished by the positions of the feathers in the shaft so that, upon renewal of any or all of the valve members, such renewals will be properly located. In Fig. 1, as also Fig. 2, the valves are set thus:—$h$ has just closed its exhaust and is about to draw in a new charge, $i$ is drawing in a charge, $k$ is compressing, and $l$ is firing, the spark-plug $n$ being shown in Fig. 2, and the mixture fills all of the valve members for the reason that all of said members are open at their ends but, in view of the fact that the exhaust passages are in the outer surfaces of the said members, none of the mixture can pass from the interior of the members to the exhaust manifold but is free to enter each of the cylinders when the communication is made with any one of the valve members.

By means of my rotary valve I secure noiseless operation because of the balanced construction, eliminating gears, push-rods, bell-cranks, puppet-valves, etc.; insurance against unequal or excessive expansion or contraction of the parts for the reason that I form the valve of separate members, each of which has a provision made for expansion and contraction as described; economy of power as there are no valves to lift against heavy gas pressure; gasolene and air well mixed because of the rotary movement of the valve members, assisted by the internal flanges; simplicity of construction and installation, as well as of substitution or repair, and ease in cleansing, and, because of the provisions for expansion and contraction, my valve may be used with air-cooled engines.

While I have shown a present preferred form and arrangement of the parts, I am not necessarily limited thereto, as many changes in and modifications of the same may suggest themselves, or may be found advisable to meet varying conditions, and, with a reservation to myself of all such changes as may come within the scope of the following claims what I claim as new, and desire to secure by Letters Patent, is:—

1. The combination with a multi-cylinder engine; of a shaft, means for rotating the same, a plurality of spaced hollow valve members open at each end interchangeably mounted thereon, one over each cylinder, said members being longitudinally split at one side thereof to permit expansion and contraction, and being overlapped at the joint thereof to prevent leakage, a casing for said members provided with inlet ports between said members, and exhaust ports for corresponding cylinders, and said members having, each, an inlet port in constant communication with said casing inlet ports, and adapted for communication with a corresponding cylinder, and having an exhaust passage adapted to connect a corresponding cylinder and casing exhaust port.

2. The combination with a multi-cylinder engine; of a shaft, means for rotating the same, a plurality of spaced hollow valve members open at each end interchangeably mounted thereon, one over each cylinder, a casing for said members provided with inlet ports arranged therebetween, said members being hollow and open-ended and having a plurality of heat radiating flanges therein, and having, each, an inlet port in constant communication with said casing inlet ports and adapted for communication with a corresponding cylinder and with an exhaust passage adapted to connect a corresponding cylinder and casing exhaust port.

3. The combination with a multi-cylinder engine; of a shaft, means for rotating the same, a plurality of spaced hollow valve members open at each end interchangeably mounted thereon, one over each cylinder, a casing for said members provided with inlet ports therebetween and with outlet ports adjacent corresponding cylinder ports, and said members being provided, each, with an inlet port cut through the wall thereof and in constant communication with said casing inlet ports and adapted for communication with a corresponding cylinder port, and with an exhaust passage formed in the surface of the wall thereof, out of communication with the interior of said member, and adapted to connect corresponding cylinder ports and casing exhaust ports.

In testimony that I claim the foregoing as my invention I have signed my name in presence of the subscribing witnesses.

DAVID BOWMAN.

Witnesses:
S. A. LITTLE,
GEO. S. MONTGOMERY.